(12) United States Patent
Backa

(10) Patent No.: US 9,189,427 B2
(45) Date of Patent: Nov. 17, 2015

(54) SYSTEM AND METHOD FOR POLICY-BASED DATA ARCHIVING TRIGGERED BY USER ACTIVITY

(76) Inventor: Bruce Backa, Incline Village, NV (US)

(*) Notice: Subject to any disclaimer, the term of this patent is extended or adjusted under 35 U.S.C. 154(b) by 1388 days.

(21) Appl. No.: 12/608,526

(22) Filed: Oct. 29, 2009

(65) Prior Publication Data

US 2010/0106923 A1    Apr. 29, 2010

Related U.S. Application Data

(60) Provisional application No. 61/109,376, filed on Oct. 29, 2008, provisional application No. 61/109,370, filed on Oct. 29, 2008.

(51) Int. Cl.
| | | |
|---|---|---|
| G06F 12/02 | (2006.01) | |
| G06F 12/16 | (2006.01) | |
| G06F 17/00 | (2006.01) | |
| G06F 17/30 | (2006.01) | |

(52) U.S. Cl.
CPC ............. *G06F 12/16* (2013.01); *G06F 17/00* (2013.01); *G06F 17/30073* (2013.01)

(58) Field of Classification Search
CPC ............ G06F 11/1451; G06F 11/1469; G06F 17/30215; G06F 11/1402; G06F 11/1471; G06F 2201/84; G06F 17/30073; G06F 17/30088; G06F 17/30575; G06F 12/02; G06F 17/00
USPC .................................................. 711/161, 162
See application file for complete search history.

(56) References Cited

U.S. PATENT DOCUMENTS

| | | | | |
|---|---|---|---|---|
| 5,583,983 | A * | 12/1996 | Schmitter | 717/138 |
| 8,365,241 | B1 * | 1/2013 | Gunda | 726/1 |
| 2005/0262097 | A1 * | 11/2005 | Sim-Tang et al. | 707/10 |
| 2006/0282630 | A1 * | 12/2006 | Hochberg et al. | 711/160 |
| 2007/0179990 | A1 * | 8/2007 | Zimran et al. | 707/201 |
| 2009/0144341 | A1 * | 6/2009 | Hauck et al. | 707/202 |
| 2010/0179943 | A1 * | 7/2010 | Anand et al. | 707/646 |

* cited by examiner

*Primary Examiner* — Hashem Farrokh

(74) *Attorney, Agent, or Firm* — Sampson & Associates, P.C.

(57) ABSTRACT

A system and method for providing cost-effective policy-based data archiving triggered by end-user activity. When an end-user makes a request to store data, the storage device communicates with a storage policy rules software engine. The storage policy rules software engine compares the user activity to a set of previously established rules and then invokes a translation software engine to translate the intended actions into instructions specific for a particular data archiving product in order for that application to archive data as intended.

22 Claims, 1 Drawing Sheet

System and Method for Policy -Based Data Archiving Triggered by User Activity
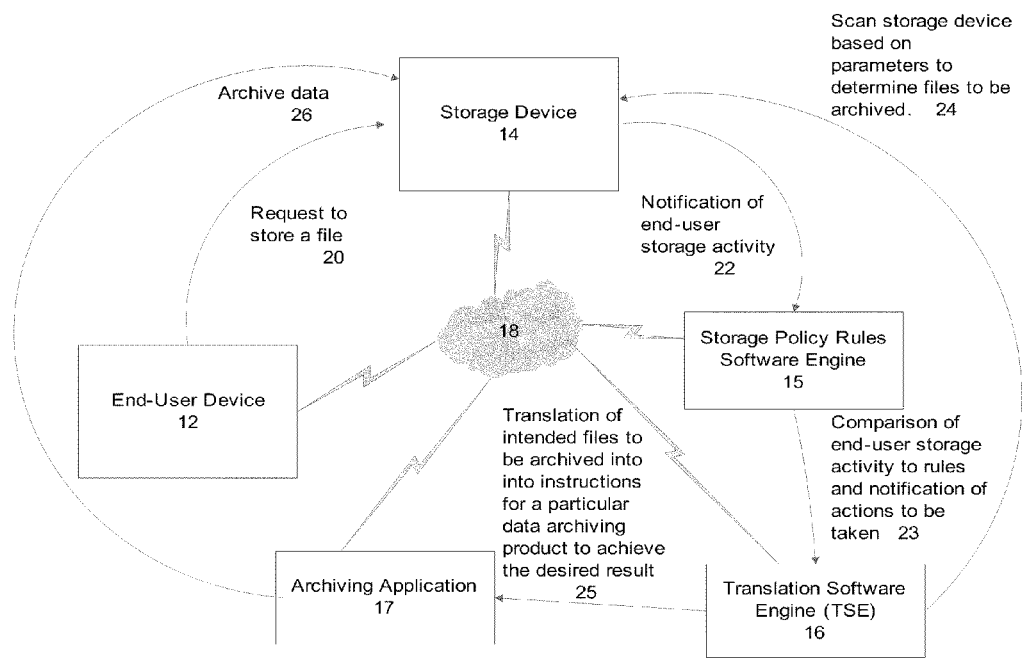

SYSTEM AND METHOD FOR POLICY-BASED DATA ARCHIVING TRIGGERED BY USER ACTIVITY

CROSS-REFERENCE TO RELATED APPLICATIONS

This application claims the benefit of U.S. Provisional Application Ser. No. 61/109,376 entitled "System and Method for Policy-Based Data Archiving Triggered by User Activity" filed on Oct. 29, 2008 and U.S. Provisional Application Ser. No. 61/109,370 entitled "System and Method for User-Driven Data Archiving" filed on Oct. 29, 2008, both incorporated herein fully by reference.

TECHNICAL FIELD

The present invention relates to data archiving and more particularly, to a cost-effective system and method for policy-based data archiving triggered by user activity.

BACKGROUND INFORMATION

It is important for companies to find cost effective ways to manage their digital file storage. Although it may seem that file storage is inexpensive, 80% or more of the total cost of ownership is in managing and administering that storage. Most organizations' need for file storage is growing at 40% to 50% per year, along with the cost to manage that storage. Many companies attempt to manage costs by having various tiers of storage, with different costs for each of these tiers. Along with this, most take the simplistic and costly approach of moving data solely based on when it was last used: "archive everything over x days old" from the higher costs primary storage tiers to the lower cost archiving storage tiers.

But even this approach results in much greater costs than necessary as the data movement is not directly tied to storage policies, applicable rules, and/or the related actions that should be taken when specific user activity occurs. Instead, the archiving software must scan the entire file system week after week or month after month, with little result after the first such scan has been run. (If the data hadn't been used for 2 years at the last scan, the odds that the data have now been used are very small.)

A number of storage software vendors provide solutions that will move or archive data. However all of these technologies rely on the IT Department configuring an archive application to look for files over "x" days old and archive that data. Then in order for the now configured archive solution to do its job, it must scan the entire primary storage device looking for files that meet the configuration profile established by the IT Department. These solutions do not include any mechanism which detects user activity, compares the user activity to a set of rules (storage policies) and then activates the archiving application based on the user's actions and the applicable rules. In and of itself, this means that all of these legacy applications waste system resources (time-consuming scans greatly affect system performance) and are unnecessarily costly. Remember, the goal of archiving isn't to create the archive. It is to manage storage costs. If nothing were to change in primary storage, archiving would never be needed.

Accordingly, what is needed is a cost-effective system and method for policy-based data archiving that is triggered by user activity. By reacting to changes in primary storage as they happen, a much more cost-effective solution can be built. Such solution should be able to interact with any number of currently or future available archiving solutions.

SUMMARY

The invention includes the following components: a mechanism to monitor end-user file access as it happens; a database or structure that contains rules against which user activity is measured; a database or structure that contains actions to be taken when user activity meets the criteria of a rule; a mechanism to translate the intended action into a set of instructions for a particular data archiving or data movement product; and a mechanism to satisfy the requirements of network security and convey the instructions to the data archiving product

BRIEF DESCRIPTION OF THE DRAWINGS

These and other features and advantages of the present invention will be better understood by reading the following detailed description, taken together with the drawings wherein:

FIG. 1 is block diagram of a system implementing the system and method of the present invention.

DETAILED DESCRIPTION OF THE PREFERRED EMBODIMENTS

The present invention will be explained in connection with an exemplary system 10, FIG. 1, including an end-user device 12, such as a computer, laptop, PDA, Smart phone or the like. End-user device 12 is meant to encompass a workstation, personal computer, personal digital assistant (PDA), wireless telephone, or any other suitable computing device including a processor, a computer readable medium upon which computer readable program code (including instructions and/or data) may be disposed, and a user interface, all of which require or could benefit from primary and archiving storage.

Each end-user device is coupled to a storage device 14 that is used for primary (day to day) storage, in may also be used for long term storage or archiving. The primary storage and long-term or archiving storage may be performed on two different areas of the same physical storage device 14 or alternatively, may be performed on two physically different and/or remotely located storage devices 14.

Storage device 14 may include any number of storage devices, including, but not limited to, Network Attached Storage (NAS) such as those available from EMC Corporation (Hopkinton, Mass., USA) and NetApp (Sunnyvale, Calif., USA), Storage Area Network (SAN) devices such as, but not limited to, those from EMC Corporation (Hopkinton, Mass., USA), and direct attached storage devices (DAS) such as, but not limited to, devices running the Microsoft Windows Server operating system.

The exemplary system also includes a storage policy rules software engine 15, such as NTP Software QFS® available from NTP Software, Nashua NH. The storage policy rules software engine 15 may reside directly on the end-user device 12 or on another server or platform and is configurable allowing an administrator or other allowable individual to configure the archiving rules and those activities that should trigger the archiving rules, as will be explained in greater detail below. Also provided is a translation software engine (TSE) 16 (previously sometimes referred to as a user driven archiving software engine (UDA)). The TSE 16 is located on a server that may perform other functions and may provide other features to the network such as hosting a database. The primary purpose of the translation software engine 16 is to serve as an intermediary between the storage policy rules software engine 15 and the archiving application 17. The translation software engine 16 receives archiving commands from the storage, policy rules software engine 15 and using lookup tables, database, hard coded programming, configuration files or the like, translates those commands into instructions or commands specific to the predetermined specific archiving application 17 in use at this particular site. TSE 16 may also handle appropriate security requirements, e.g., to ensure that the particular user at device 12 has requisite permissions, etc. Archiving application 17 may reside on an archiving application server that is separate from TSE 16, or alternatively, archiving application 17 and TSE 16 may reside on the same server.

The file archiving application 17 may be a standard off the shelf application. A non-limiting example of an archiving application suitable for use in connection with the present invention includes the Symantec Enterprise Vault archiving application (Symantec Corporation, Cupertino Calif., USA) although other archiving application software/devices are considered to be within the scope of the present invention.

The end-user device 12, storage device 14, and the server that holds the TSE 16, are coupled together over a local or wide area network by means of a network communication path 18. The end-user device 12 may be any form of computing or data processing device requiring access to data stored on the storage device 14.

Terms such as "server", "application", "engine" and the like are intended to refer to a computer-related component, including hardware, software, and/or software in execution. For example, an engine may be, but is not limited to being, a process running on a processor, a processor including an object, an executable, a thread of execution, a program, and a computer. Moreover, the various components may be localized on one computer and/or distributed between two or more computers.

An administrator would first configure the storage policy rules software engine 15 as to what storage policies (rules) should be enforced when end-users attempt to store or manipulate data. Manipulate includes, but is not limited to, when a user tries to extend, change, or delete data. When an end-user tries to store, extend, or change a file (act 20), the storage device 14 is configured to notify (act 22) the storage policy rules software engine 15, which compares the end-user's request (act 20) to a pre-established set of rules previously set up by the administrator/IT department in the storage policy rules software engine 15.

An example of a pre-established rule would be that a particular user is being managed by a policy that states the limit they can store on a particular folder on a particular storage device 14 is 1 gig of data. If the user reaches this limit, a pre-established algorithm in the storage policy rules software engine 15 is invoked. This pre-established algorithm will determine which types of files should be archived. This algorithm might indicate what types of files should be archived based on the age of the files and/or the size of the files or other criteria.

Based on such a pre-determined rule and previously established algorithm, the storage policy rules software engine 15 notifies the TSE 16 of what parameters should be used to scan the particular user folder which may be on the end user device 12 or on the storage device 14. An example of parameters might be file age or file type. This example shows that based on the applicable rules, the storage policy rules software engine 15 notifies (act 23) the TSE 16 of what actions to take and what parameters to utilize in taking those actions.

The TSE 16 scans (act 24) the storage device 14 to determine what files meet the criteria for archiving. Thereafter the TSE 16 translates the intended actions into specific instructions 25 for a particular archiving application 17 to archive data 26 from where the data now resides to where it is to be archived, based on the rules (in the storage policy rules software engine 15) and actions triggered by the user activity (act 20).

An example might be that the TSE 16 communicates with the archiving application 17 such that an archiving policy is created to have the archiving application 17 migrate, to an archiving storage location, all files over 50 meg in size, located in a particular user home drive folder, and that have not been accessed in the past 180 days.

To enable policy-based data archiving triggered by user activity, in particular representative embodiments, the following components are needed:
  a mechanism to monitor end-user file access as it happens (storage policy rules software engine 15 in conjunction with the storage device 14)
  a database or structure that contains rules against which user activity is measured (storage policy rules software engine 15)
  a database or structure that contains actions to be taken when user activity meets the criteria of a rule (storage policy rules software engine 15)
  a mechanism to translate the intended action into a set of instructions for a particular data archiving product (TSE 16) and
  a mechanism to satisfy the requirements of network security and convey the instructions to the data archiving product (TSE 16)

All mechanisms mentioned but not detailed herein are considered to be within the knowledge of those skilled in the art.

Modifications and substitutions by one of ordinary skill in the art are considered to be within the scope of the present invention, which is not to be limited except by any allowed claims and legal equivalents thereof.

What is claimed is:

1. A policy based data archiving system, comprising:
  a user activity monitor, coupled to an end user device, for monitoring, in real time, an end user's attempt to access data stored on a user folder of the user's primary storage device, said user activity monitor configured to react in real time to said end user's attempt by triggering archival of one or more files other than the data of said end user's attempt, wherein responsive to said end user's attempt to access data on said primary storage device, said user activity monitor provides a notification of said attempt, said notification including an indication of the nature of said end user's attempt;
  a storage policy rules device, responsive to said notification of said attempt by said end user to access data on said primary storage device, for accessing one or more storage policy rules previously established and stored on said storage policy rules device, and for comparing said nature of said end-user's attempt with said one or more storage policy rules, and responsive to an indication that said nature of said end-user's attempt corresponds to at least one of said one or more storage policy rules, for providing an indication of said correspondence;
  an archiving translation device, coupled to said storage policy rules device, and responsive to said indication of said correspondence between said end-users attempt and said at least one of said one or more storage policy rules, for utilizing said at least one of said one or more storage policy rules to scan said storage device and for identifying said one or more files other than the data of said end user's attempt, which must be archived based upon said at least one of said one or more storage policy rules, and responsive to said identification of one or more files to be archived, for providing said identification to an archiving application, and for providing to said archiving application one or more commands understandable by said archiving application, said one or more commands including specific instructions for said archiving application as to how to handle said identified files to be archived from the user folder of the user's primary storage device to archiving storage.

2. A policy based data archiving system, comprising:
a user activity monitor communicably couplable to an end user device; and
a storage policy rules device configured to access one or more storage policy rules;
the user activity monitor configured for monitoring, in real time, an end user's attempt to access data stored on a user folder of the user's storage device associated with the end user device, said user activity monitor configured to react in real time to said end user's attempt by triggering archival of one or more files other than the data of said end user's attempt, wherein the user activity monitor is configured to be responsive to the end user's attempt to access data, providing a notification to the storage policy rules device, of the nature of the user's attempt;
the storage policy rules device configured for accessing, in response to said notification, said one or more storage policy rules;
the storage policy rules device further configured for comparing the nature of the end-user's attempt with the one or more storage policy rules, and for generating an indication of whether the nature corresponds to at least one of the one or more storage policy rules; and
wherein the indication is configured to be usable by an archiving translation device to identify said one or more files other than the data of said end user's attempt to be archived and to generate archival commands usable by an archiving application to archive the one or more files from the user folder of the user's primary storage device to archiving storage.

3. The policy based data archiving system of claim 2, comprising:
the archiving translation device, communicably coupled to said storage policy rules device;
the archiving translation device configured for utilizing, in response to said indication, said at least one of said one or more storage policy rules to scan said storage device to identify any files which may be archived;
said archiving translation device further configured, in response to said identification of any files to be archived, for providing said identification to an archiving application;
said archiving translation device further configured for providing to said archiving application one or more commands understandable by said archiving application, for handling said identified files.

4. The policy based data archiving system of claim 3, wherein the archiving translation device is further configured to satisfy requirements of network security.

5. The policy based data archiving system of claim 3, comprising the archiving application.

6. The policy based data archiving system of claim 5, wherein the archiving application comprises an archiving application.

7. The policy based data archiving system of claim 6, wherein the archiving application comprises a Symantec Enterprise Vault archiving application.

8. The policy based data archiving system of claim 3, comprising the storage device.

9. The policy based data archiving system of claim 8, wherein the storage device comprises a Network Attached Storage (NAS) device.

10. The policy based data archiving system of claim 8, wherein the storage device comprises a Storage Area Network (SAN) device.

11. The policy based data archiving system of claim 8, wherein the storage device comprises a direct attached storage (DAS) device.

12. A method for policy based data archiving, comprising:
(a) providing a user activity monitor communicably couplable to an end user device;
(b) providing a storage policy rules device configured to access one or more storage policy rules;
(c) configuring the user activity monitor for monitoring, in real time, an end user's attempt to access data stored on a user folder of the user's primary storage device associated with the end user device;
(d) configuring the user activity monitor to react in real time to said end user's attempt by triggering archival of one or more files other than the data of said end user's attempt, wherein the user activity monitor is responsive to the end user's attempt to access data, providing a notification to the storage policy rules device, of the nature of the user's attempt;
(e) configuring the storage policy rules device for accessing, in response to the notification, the one or more storage policy rules;
(f) configuring the storage policy rules device for comparing the nature of the end-user's attempt with the one or more storage policy rules, and for generating an indication of whether the nature corresponds to at least one of the one or more storage policy rules; and
(g) configuring the indication to be usable by an archiving translation device to identify said one or more files other than the data of said end user's attempt to be archived and to generate archival commands usable by an archiving application to archive the one or more files from the user folder of the user's primary storage device to archiving storage.

13. The method of claim 12, comprising:
(h) providing the archiving translation device, and communicably coupling the archiving translation device to the storage policy rules device;
(i) configuring the archiving translation device for utilizing, in response to the indication, the at least one of the one or more storage policy rules to scan said storage device to identify any files which may be archived;
(j) configuring the archiving translation device to, in response to the identification of any files to be archived, provide the identification to an archiving application;
(k) configuring the archiving translation device for providing to the archiving application one or more commands understandable by the archiving application, for handling said identified files.

14. The method of claim 13, further comprising configuring the archiving translation device to satisfy requirements of network security.

15. A method for policy based data archiving, comprising:
(a) communicably coupling a user activity monitor communicably to an end user device;

(b) communicably coupling a storage policy rules device to the user activity monitor to access one or more storage policy rules;
(c) monitoring in real time, using the user activity monitor, an end user's attempt to access data stored on a user folder of the user's primary storage device associated with the end user device;
(d) providing, with the user activity monitor, a reaction in real time to said end user's attempt by triggering archival of one or more files other than the data of said end user's attempt, wherein said providing (d) includes, in response to the end user's attempt to access data, a notification to the storage policy rules device of the nature of the user's attempt;
(e) accessing, with the storage policy rules device in response to the notification, the one or more storage policy rules;
(f) comparing, with the storage policy rules device, the nature of the end-user's attempt with the one or more storage policy rules, and generating an indication of whether the nature corresponds to at least one of the one or more storage policy rules; and
(g) sending the indication to an archiving translation device to identify said one or more files other than the data of said end user's attempt to be archived and to generate archival commands usable by an archiving application to archive the one or more files from the user folder of the user's primary storage device to archiving storage.

16. The method of claim 15, comprising:
(h) communicably coupling the archiving translation device to the storage policy rules device;
(i) using, in response to the indication, the archiving translation device and the at least one of the one or more storage policy rules to scan the storage device to identify any files which may be archived;
(j) using, in response to the identification of any files to be archived, the archiving translation device to provide the identification to an archiving application;
(k) using the archiving translation device to provide to the archiving application one or more commands understandable by the archiving application, for handling the identified files.

17. The method of claim 16, further comprising using the archiving translation device to satisfy requirements of network security.

18. The method of claim 16, further comprising communicably coupling the archiving translation device to the archiving application.

19. The method of claim 16, comprising communicably coupling the storage policy rules device to the storage device.

20. The method of claim 19, comprising communicably coupling the storage policy rules device to a Network Attached Storage (NAS) device.

21. The policy based data archiving system of claim 19, comprising communicably coupling the storage policy rules device to a Storage Area Network (SAN) device.

22. The policy based data archiving system of claim 19, wherein comprising communicably coupling the storage policy rules device to a direct attached storage (DAS) device.

* * * * *